(12) United States Patent
Kirkland et al.

(10) Patent No.: US 8,317,136 B2
(45) Date of Patent: Nov. 27, 2012

(54) STABILIZED CONTROLLABLE DROGUE FOR AERIAL FLIGHT REFUELING

(75) Inventors: William L. Kirkland, Kingman, AZ (US); Eric Reed, Kingman, AZ (US)

(73) Assignee: West Coast Netting, Inc., Kingman, AZ (US)

( * ) Notice: Subject to any disclaimer, the term of this patent is extended or adjusted under 35 U.S.C. 154(b) by 226 days.

(21) Appl. No.: 12/831,185

(22) Filed: Jul. 6, 2010

(65) Prior Publication Data

US 2011/0226905 A1 Sep. 22, 2011

Related U.S. Application Data

(60) Provisional application No. 61/223,339, filed on Jul. 6, 2009.

(51) Int. Cl.
*B64D 39/00* (2006.01)

(52) U.S. Cl. ............... 244/135 A; 244/135 R; 244/1 TD

(58) Field of Classification Search .............. 244/135 A, 244/135 R, 138, 1 TD, 134; 701/3; 141/279, 141/387, 388; 137/615
See application file for complete search history.

(56) References Cited

U.S. PATENT DOCUMENTS

| | | | |
|---|---|---|---|
| 2,960,291 A * | 11/1960 | Patterson | 244/113 |
| 2,998,949 A * | 9/1961 | Patterson | 244/145 |
| 6,588,465 B1 | 7/2003 | Kirkland et al. | |
| 6,604,711 B1 | 8/2003 | Stevens et al. | |
| 2008/0054124 A1* | 3/2008 | Takacs et al. | 244/135 A |
| 2010/0108815 A1* | 5/2010 | Stecko et al. | 244/135 A |

\* cited by examiner

*Primary Examiner* — Christopher P Ellis
*Assistant Examiner* — Medhat Badawi
(74) *Attorney, Agent, or Firm* — Fulwider Patton LLP

(57) ABSTRACT

The stabilized controllable drogue for an inflight aerial refueling system includes a reception coupling, a paradrogue frame, a drogue canopy, and a plurality of actuators for moving the drogue canopy in a desired direction to control, steer and stabilize the stabilized controllable drogue during turbulent conditions.

21 Claims, 2 Drawing Sheets

STABILIZED CONTROLLABLE DROGUE FOR AERIAL FLIGHT REFUELING

CROSS-REFERENCE TO RELATED APPLICATIONS

This application is based on Provisional Application No. 61/233,339, filed Jul. 6, 2009.

GOVERNMENT LICENSE RIGHTS

The U.S. Government has a paid-up license in this invention and the right in limited circumstances to require the patent owner to license others on reasonable terms as provided for by the terms of Contract Number N68335-08-C-0083 awarded by the Naval Air Systems Command of the U.S. Navy.

BACKGROUND OF THE INVENTION

This invention relates generally to aerodynamic drogues for aerial inflight refueling, and more particularly concerns an improved aerial inflight refueling drogue assembly or paradrogue assembly having one or more actuators for moving the drogue canopy in a desired direction to control, steer and stabilize the paradrogue assembly during turbulent conditions.

The development of drogues for inflight refueling of aircraft has been primarily directed by the need to stabilize a refueling hose trailing from a tanker aircraft in a generally horizontal attitude. The drogue provides drag for the refueling coupling, which must resist the forward movement of a probe from a refueling aircraft. It has been a common practice to install either a low or high speed configuration drogue on the refueling coupling of a tanker aircraft on the ground, depending upon whether the aerial refueling is to take place at low or high speed, and to land to change the drogue to one of another speed configuration when an aircraft needs to be refueled at a different speed. Another approach has been to provide a passive variable speed drogue to maintain substantially constant loads on the drogue within a range of refueling speeds. However, during rough weather or other turbulent conditions an aerial refueling paradrogue assembly and reception coupling at the trailing or aft end of a fuel supply hose of an aerial refueling supply aircraft for refueling a receiver aircraft can otherwise move around uncontrollably, requiring a pilot of the receiver aircraft to move the receiver aircraft in such a manner so as to replicate movements of the paradrogue assembly at the trailing or aft end of the fuel supply hose, to connect the receiver aircraft with the aerial refueling reception coupling of the aerial refueling paradrogue assembly at the trailing or aft end of a fuel supply hose of the aerial refueling supply or tanker aircraft.

One aerial refueling drogue is known that controls the positioning of the drogue with aerodynamic collapsible lifting surfaces formed as fins that are operated by electromechanical, hydraulic or pneumatic actuators and that are integral with the paradrogue base, and controlled thrust is provided by thrust nozzles attached to the base assembly of the paradrogue. It would desirable to provide a system for controlling and stabilizing existing drogue canopies and couplings for inflight refueling of aircraft during turbulent conditions to enable the paradrogue coupling assembly to move in the same manner as the receiver aircraft, to reduce the work load for a pilot of the receiver aircraft, and to allow a receiving aircraft to connect to a reception coupling during rough weather conditions and other turbulent refueling conditions.

It would also be desirable to provide a system for controlling and stabilizing existing drogue canopies and couplings for inflight refueling of aircraft during turbulent conditions to allow autonomous refueling of manned or unmanned receiver aircraft from a paradrogue assembly of a manned or unmanned aerial refueling supply or tanker aircraft, such as when each have control systems on board to coordinate movement of the receiver aircraft and the paradrogue assembly to allow them to connect. The present invention meets these and other needs.

SUMMARY OF THE INVENTION

Briefly, and in general terms, the present invention provides for a stabilized controllable drogue or paradrogue assembly for an inflight aerial refueling system, the stabilized controllable drogue or paradrogue assembly including a reception coupling, a paradrogue frame, a drogue canopy, and one or more actuators for moving the drogue canopy in a desired direction to control, steer and stabilize the paradrogue assembly during turbulent conditions.

Accordingly, the present invention provides for a stabilized controllable drogue or paradrogue assembly including a reception coupling of the stabilized controllable drogue includes a forward portion configured to be connected to a fuel supply hose that is trailed from a tanker aircraft during aerial refueling, and an open rearward throat section configured to connect with a refueling probe of a receiver aircraft that is refueling. In a presently preferred aspect, the reception coupling also includes an outer cover or shroud that protects components mounted on the reception coupling. The paradrogue frame includes a plurality of leading edge struts are pivotally mounted to the trailing edge portion of the reception coupling, such as by an attachment ring, for example. The leading edge struts each have a leading or forward end and a trailing or trailing or aft end, and in a presently preferred aspect, the trailing or aft ends of the leading edge struts include a hook for attaching the drogue canopy, such as by a cord, cable, hooks or loops, or the like. The paradrogue frame also includes a plurality of leading edge positioning arms each having a radially inner end and a radially outer end, and the radially inner end of the leading edge positioning arm is pivotally connected to the leading edge strut near or at the trailing or aft end of the leading edge strut. The drogue canopy is fixedly attached between the trailing or aft end of the leading edge struts and the radially outer end of the leading edge positioning arm. The radially outer end of the leading edge positioning arm is rotatably movable between a relatively radially inward position and a relatively radially outward position. In a presently preferred aspect, the relatively radially inward position is a default or neutral position. In a presently preferred aspect, the radially outer end of the leading edge positioning arm also includes a hook for attaching the drogue canopy.

One or more control cords or cables are provided, each having a forward end and an aft end, with each of the aft ends of the plurality of control cords or cables connected to a control portion of a corresponding one of the plurality of leading edge positioning arms, respectively. The aft ends of the plurality of control cords or cables are connected typically intermediate the radially inner end and the radially outer end of the leading edge positioning arms. Each forward end of the one or more control cords or cables is connected to one or more corresponding actuators operative to move the one or more control cords or cables to cause the leading edge of the drogue canopy to move radially, to thereby cause at least a portion of the paradrogue assembly to move radially in a desired direction.

The one or more actuators are typically mounted on the reception coupling. In a presently preferred aspect, the actuators are mounted in a quadrant fashion positioned about a longitudinal central axis of the reception coupling and are located substantially equidistant from the longitudinal central axis and approximately 90° apart from each other, although the plurality of actuators may be alternatively mounted in other configurations, such as mounted so as to be positioned about the longitudinal central axis of the reception coupling and located substantially equidistant from the longitudinal central axis and approximately 120° apart from each other, for example. In a presently preferred aspect, the forward end of at least one of a plurality of control cords or cables are connected to one of the plurality of actuators, and the actuators are operative to pull at least one of the plurality of control cords or cables connected to the control portion of a leading edge positioning arm to cause the leading edge of the drogue canopy to move radially outward, to thereby cause a portion of the leading edge of the paradrogue assembly to move radially outward. In another presently preferred aspect, each of the plurality of control cords or cables can be separately and independently connected to a corresponding one of the plurality of actuators, respectively, whereby each of the plurality of the leading edge positioning arms can be manipulated independently by the plurality of actuators or in a blended manner to cause the entire drogue canopy to steer in a desired direction. In another presently preferred aspect, a subset of the plurality of the control cords or cables can be connected to one of the plurality of actuators, whereby a plurality of the leading edge positioning arms corresponding to the subset of the plurality of control cords or cables can be manipulated simultaneously by the same actuator to cause the drogue canopy to steer in a desired direction. In another presently preferred aspect, the actuators are also operative to push at least one of the plurality of control cords or cables connected to the control portion of a leading edge positioning arm to cause the leading edge of the drogue canopy to move radially inward, to thereby cause a portion of the leading edge of the paradrogue assembly to move radially inward.

A control system operative to sense turbulence and operate at least one of the one or more actuators can also be provide, with each actuator being connected to at least one of the one or more positioning arm control cables to move the paradrogue assembly in a desired direction and to stabilize the paradrogue assembly and reception coupling assembly during turbulent conditions.

These and other aspects and advantages of the invention will become apparent from the following detailed description and the accompanying drawings, which illustrate by way of example the features of the invention.

DETAILED DESCRIPTION OF THE PREFERRED EMBODIMENTS

Figure 1:
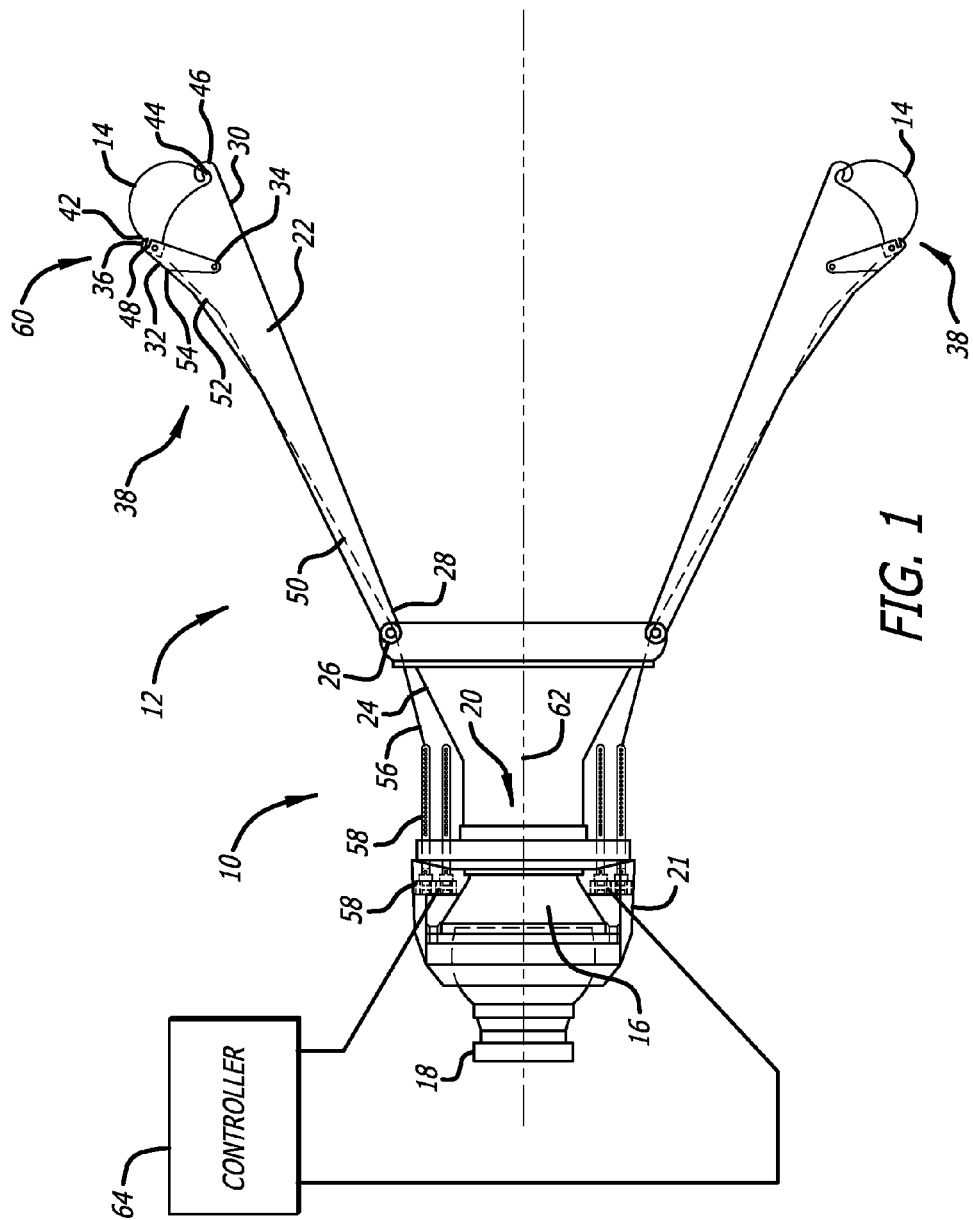
FIG. 1 is a schematic sectional elevational view of the stabilized controllable drogue of the present invention shown in a standard neutral or default relatively radially inward flying position.
Figure 2:
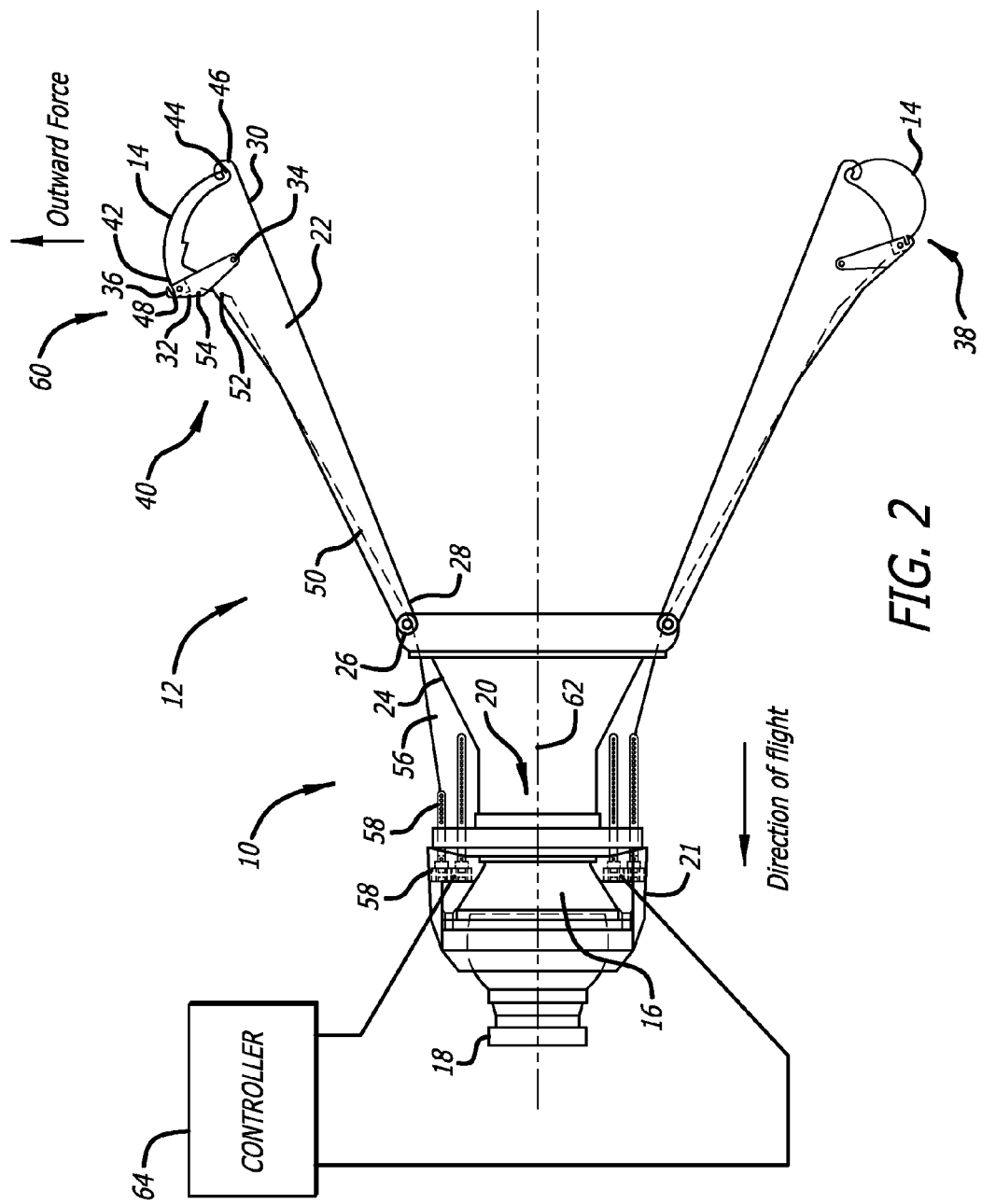
FIG. 2 is a schematic sectional elevational view of the stabilized controllable drogue of the present invention showing a top portion in a manipulated relatively radially outward flying position, and a bottom portion in a standard neutral or default flying position.

Referring to FIGS. 1 and 2, which are provided by way of example, and not by way of limitation, the present invention provides for a stabilized controllable drogue assembly or paradrogue assembly that is configured to be used with an inflight aerial refueling system. Such an inflight aerial refueling system typically includes a fuel supply (not shown), such as a fuel tank in a tanker aircraft, an aircraft drogue stowage tube (not shown) which can be mounted in a wing pod or fuselage of a tanker aircraft for stowing the drogue, and a fuel supply hose (not shown) that can be extended and retracted during flight for refueling other aircraft, that is connected for fluid communication with the fuel supply. As is illustrated in FIGS. 1 and 2, the stabilized controllable drogue assembly or paradrogue assembly 10 includes a paradrogue frame 12, a drogue canopy 14, and a reception coupling 16. The reception coupling includes a forward portion 18 configured to be connected to a fuel supply hose that is trailed from a tanker aircraft during aerial refueling, and an open rearward throat section 20 configured to connect with a refueling probe (not shown) of a receiver aircraft that is refueling. The reception coupling can include an outer cover or shroud 21 to protect components mounted on the reception coupling, as will be further explained below.

A plurality of leading edge struts 22 are pivotally mounted to the trailing edge portion 24 of the reception coupling, such as by an attachment ring 26, for example. The leading edge struts each have a leading or forward end 28 and a trailing or trailing or aft end 30. A leading edge positioning arm 32 is pivotally connected to each of the leading edge struts, and includes a radially inner end 34 and a radially outer end 36. The radially inner end of the leading edge positioning arm preferably is pivotally connected to the leading edge strut near or at the trailing or aft end 30 of the leading edge strut. The radially outer end of the leading edge positioning arm is rotatably movable between a relatively radially inward position 38 and a relatively radially outward position 40. In a presently preferred aspect, the relatively radially inward position is a default or neutral position. The drogue canopy includes a leading edge 42 and a trailing edge 44, and is fixedly attached between the trailing or aft end of the leading edge struts and the radially outer end of the leading edge positioning arm. The trailing or aft ends of the leading edge struts preferably include a hook 46 for attaching the drogue canopy, such as by a cord, cable, hooks or loops, or the like. The radially outer end of the leading edge positioning arm similarly preferably includes a hook 48 for attaching the drogue canopy in the same fashion.

One or more control cords or cables 50 is connected at an aft end 52 to a corresponding control portion 54 of the leading edge positioning arm, typically intermediate the radially inner end and the radially outer end of the leading edge positioning arm. A forward end 56 of the one or more control cords or cables is in turn connected to one or more corresponding actuators 58 operative to move the one or more control cords or cables to cause the leading edge of the drogue canopy to move radially in a desired direction, such as to pull the one or more control cords or cables forwardly to cause the leading edge of the drogue canopy to move radially outwardly, thereby causing the leading edge 60 of the paradrogue assembly to move radially outward at the portion of the drogue canopy being manipulated.

One or more leading edge positioning arms can be manipulated at the same time from the same actuator or by a plurality of actuators. In a presently preferred aspect, one or more actuators to operate the one or more leading edge positioning arms located on the leading edge struts of the paradrogue frame are placed on the reception coupling, and may be covered and protected by the reception coupling cover or shroud. The actuators can also be operated to move the control cords or cables rearwardly to cause the leading edges of the positioning arms to be moved rearwardly, to provide a steering function producing a radially inwardly directed force, to move the leading edge of the drogue canopy radially inwardly. Locations of the actuators can be in a quadrant fashion positioned about a longitudinal central axis 62 of the reception coupling and are located substantially equidistant from the longitudinal central axis and approximately 90° apart from each other, or alternatively may be positioned about a longitudinal central axis of the reception coupling and are located substantially equidistant from the longitudinal central axis and approximately 120° apart from each other. All of the positioning arms could be operated at the same time in a blended manner to cause the entire drogue canopy to steer in a given direction. In a presently preferred aspect, the standard flying position 38 illustrated in FIG. 1 and at the bottom of FIG. 2 is a neutral position where the system flies as a regular paradrogue system. This also becomes the default position for system malfunctions, allowing refueling to be made even in the event of system malfunctions.

A controller 64 operatively connected to the one or more actuators can be provided to sense turbulence and operate the one or more of the actuators, to in turn actuate one or more positioning arm control cables to move one or more portions of the paradrogue assembly in one or more desired directions. This actuation would stabilize the paradrogue assembly and reception coupling assembly during turbulent conditions. The system can for example be provided with cameras within the coupling area looking aft to recognize a receiver probe of a receiver aircraft. The instrumentation would be able to induce movement in the paradrogue coupling assembly which would mimic the movement of the receiver aircraft. This would allow for the receiver aircraft to make a smooth connection to the paradrogue and reception coupling.

It will be apparent from the foregoing that while particular forms of the invention have been illustrated and described, various modifications can be made without departing from the spirit and scope of the invention. Accordingly, it is not intended that the invention be limited, except as by the appended claims.

We claim:

1. A stabilized controllable drogue assembly for an inflight aerial refueling system, comprising:
   a reception coupling having a forward portion and a trailing edge portion, said forward portion of said reception coupling being configured to be connected to a fuel supply hose trailed from a tanker aircraft during aerial refueling, and said trailing edge portion of said reception coupling including an open rearward throat section configured to connect with a refueling probe of a receiver aircraft that is refueling;
   a paradrogue frame including a plurality of leading edge struts and a plurality of leading edge positioning arms, said plurality of leading edge struts each having a leading end and a trailing end, said plurality of leading edge struts being pivotally mounted to the trailing edge portion of the reception coupling, each of said plurality of leading edge positioning arms including a radially inner end and a radially outer end, said radially inner end of the leading edge positioning arms being pivotally connected to a corresponding one of said plurality of leading edge struts near or at a trailing end of said corresponding one of said plurality of leading edge struts, said radially outer end of the plurality of leading edge positioning arms is rotatably movable between a relatively radially inward position and a relatively radially outward position;
   a drogue canopy having a leading edge and a trailing edge, said drogue canopy being fixedly attached between the trailing ends of the leading edge struts and the radially outer ends of the leading edge positioning arm;
   at least one actuator mounted on said reception coupling;
   a control cable having an aft end, said aft end of said control cable being connected to a control portion of a corresponding one of said plurality of leading edge positioning arms, said control cable having a forward end connected to said at least one actuator operative to move the control cable to cause the leading edge positioning arm and the leading edge of the drogue canopy to move radially outwardly, and to thereby cause a portion of the stabilized controllable drogue assembly to move radially outward.

2. The stabilized controllable drogue assembly of claim 1, wherein said reception coupling comprises an outer cover that protects components mounted on the reception coupling.

3. The stabilized controllable drogue assembly of claim 1, wherein said plurality of leading edge struts are pivotally mounted to the trailing edge portion of the reception coupling by an attachment ring.

4. The stabilized controllable drogue assembly of claim 1, wherein said relatively radially inward position of said plurality of leading edge positioning arms is a default position of said plurality of leading edge positioning arms.

5. The stabilized controllable drogue assembly of claim 1, wherein said trailing ends of the leading edge struts include a hook for attaching the drogue canopy.

6. The stabilized controllable drogue assembly of claim 1, wherein said radially outer ends of the leading edge positioning arms include a hook for attaching the drogue canopy.

7. The stabilized controllable drogue assembly of claim 1, wherein said at least one actuator is positioned about a longitudinal central axis of the reception coupling and are located substantially equidistant from the longitudinal central axis and approximately 90° apart from each other.

8. The stabilized controllable drogue assembly of claim 1, wherein said at least one actuator is positioned about a longitudinal central axis of the reception coupling and are located substantially equidistant from the longitudinal central axis and approximately 120° apart from each other.

9. The stabilized controllable drogue assembly of claim 1, wherein said at least one actuator is operative to pull at least one of said plurality of control cables to cause the leading edge of the drogue canopy to move radially outward, to thereby cause a portion of the leading edge of the stabilized controllable drogue assembly to move radially outward.

10. The stabilized controllable drogue assembly of claim 1, wherein said at least one actuator is operative to push at least one of said plurality of control cables to cause the leading edge of the drogue canopy to move radially inward, to thereby cause a portion of the leading edge of the stabilized controllable drogue assembly to move radially inward.

11. The stabilized controllable drogue assembly of claim 1, wherein said at least one actuator comprises a plurality of actuators and said at least one control cable includes a plurality of control cables, and wherein each of said plurality of control cables is separately and independently connected to a corresponding one of said plurality of actuators, respectively, whereby each of said plurality of said leading edge positioning arms can be manipulated independently by said plurality of actuators or in a blended manner to cause the entire drogue canopy to steer in a desired direction.

12. The stabilized controllable drogue assembly of claim 1, wherein said control cable comprises a plurality of control cables, and wherein a subset of said plurality of said control cables is connected to one of said plurality of actuators, whereby a plurality of said leading edge positioning arms corresponding to said subset of said plurality of control cables can be manipulated simultaneously by the same actuator to cause the drogue canopy to steer in a desired direction.

13. The stabilized controllable drogue assembly of claim 11, further comprising a control system operative to sense turbulence and operate at least one of said actuators connected to at least one of said positioning arm control cables to move said drogue canopy in a desired direction and to stabilize the stabilized controllable drogue assembly and reception coupling assembly during turbulent conditions.

14. A stabilized controllable paradrogue assembly for an inflight aerial refueling system, comprising:
a reception coupling having a forward portion and a trailing edge portion, said forward portion of said reception coupling being configured to be connected to a fuel supply hose trailed from a tanker aircraft during aerial refueling, and said trailing edge portion of said reception coupling including an open rearward throat section configured to connect with a refueling probe of a receiver aircraft that is refueling;
a paradrogue frame including a plurality of leading edge struts and a plurality of leading edge positioning arms, said plurality of leading edge struts each having a leading end and a trailing end, said plurality of leading edge struts being pivotally mounted to the trailing edge portion of the reception coupling, each of said plurality of leading edge positioning arms including a radially inner end and a radially outer end, said radially inner end of the leading edge positioning arms being pivotally connected to a corresponding one of said plurality of leading edge struts near or at a trailing end of said corresponding one of said plurality of leading edge struts, said radially outer end of the plurality of leading edge positioning arms is rotatably movable between a relatively radially inward position and a relatively radially outward position;
a drogue canopy having a leading edge and a trailing edge, said drogue canopy being fixedly attached between the trailing ends of the leading edge struts and the radially outer ends of the leading edge positioning arm;
a plurality of actuators mounted on said reception coupling;
a plurality of control cables each having a forward end and an aft end, each said aft end connected to a control portion of a corresponding one of said plurality of leading edge positioning arms, respectively, each said forward end connected to at least one of said plurality of actuators, respectively, whereby a plurality of said leading edge positioning arms corresponding to said at least one of said plurality of control cables are configured to be moved simultaneously by said at least one actuator to cause the drogue canopy to steer in a desired direction.

15. The stabilized controllable paradrogue assembly of claim 14, wherein said relatively radially inward position of said plurality of leading edge positioning arms is a default position of said plurality of leading edge positioning arms.

16. The stabilized controllable paradrogue assembly of claim 14, wherein said plurality of actuators are positioned about a longitudinal central axis of the reception coupling and are located substantially equidistant from the longitudinal central axis and approximately 90° apart from each other.

17. The stabilized controllable paradrogue assembly of claim 14, wherein said plurality of actuators are positioned about a longitudinal central axis of the reception coupling and are located substantially equidistant from the longitudinal central axis and approximately 120° apart from each other.

18. The stabilized controllable paradrogue assembly of claim 14, wherein said plurality of actuators are operative to pull at least one of said plurality of control cables to cause the leading edge of the drogue canopy to move radially outward, to thereby cause a portion of the leading edge of the stabilized controllable paradrogue assembly to move radially outward.

19. The stabilized controllable paradrogue assembly of claim 14, wherein said actuators are operative to push at least one of said plurality of control cables to cause the leading edge of the drogue canopy to move radially inward, to thereby cause a portion of the leading edge of the stabilized controllable paradrogue assembly to move radially inward.

20. The stabilized controllable paradrogue assembly of claim 14, further comprising a control system operative to sense turbulence and operate at least one of said plurality of actuators connected to at least one of said positioning arm control cables to move said drogue canopy in a desired direction and to stabilize the stabilized controllable paradrogue assembly and reception coupling assembly during turbulent conditions.

21. The stabilized controllable paradrogue assembly of claim 14, wherein said reception coupling comprises an outer cover that protects components mounted on the reception coupling.

\* \* \* \* \*